United States Patent
Muneer et al.

(10) Patent No.: US 7,342,438 B2
(45) Date of Patent: Mar. 11, 2008

(54) N-CHANNEL NEGATIVE CHARGE PUMP

(75) Inventors: Ahmed Muneer, Orangevale, CA (US); Bo Li, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/479,631

(22) Filed: Jun. 29, 2006

(65) Prior Publication Data

US 2008/0001651 A1    Jan. 3, 2008

(51) Int. Cl.
*G05F 1/10* (2006.01)
(52) U.S. Cl. .................................. 327/536
(58) Field of Classification Search ............ 327/534, 327/535, 536, 537
See application file for complete search history.

(56) References Cited

U.S. PATENT DOCUMENTS

| | | | |
|---|---|---|---|
| 5,767,733 A * | 6/1998 | Grugett | 327/534 |
| 6,255,896 B1 | 7/2001 | Li et al. | |
| 6,292,048 B1 | 9/2001 | Li | |
| 6,366,158 B1 | 4/2002 | Zeng et al. | |
| 6,441,678 B1 | 8/2002 | Zeng et al. | |
| 6,452,438 B1 * | 9/2002 | Li | 327/536 |
| 6,496,055 B2 | 12/2002 | Li | |
| 6,552,600 B2 | 4/2003 | Walimbe et al. | |
| 6,642,774 B1 | 11/2003 | Li | |
| 6,686,793 B2 | 2/2004 | Li | |
| 6,774,710 B2 | 8/2004 | Li | |
| 6,878,981 B2 * | 4/2005 | Eshel | 257/299 |
| 6,888,400 B2 * | 5/2005 | Lin et al. | 327/536 |
| 6,965,263 B2 * | 11/2005 | Bringivijayaraghavan | 327/537 |
| 7,224,206 B2 * | 5/2007 | Pappalardo et al. | 327/536 |
| 7,248,096 B2 * | 7/2007 | Mensi et al. | 327/536 |

OTHER PUBLICATIONS

U.S. Appl. No. 11/266,218, filed Nov. 4, 2005, Ahmed et al.

* cited by examiner

*Primary Examiner*—Jeffrey Zweizig
(74) *Attorney, Agent, or Firm*—Blakely, Sokoloff, Taylor & Zafman LLP

(57) ABSTRACT

Described herein is a negative charge pump architecture that utilizes a triple-well, no body effect NMOS circuitry. The negative charge pump utilizes triple-well N channel high mobility transistor devices with the deep N wells grounded. The parasitic bipolar transistors may be avoided such that the charge transfer occurs mainly in the channel of the transistor device. With the increased mobility of the N channel devices, negative charge pumps using N channel transistors may be more efficient and may allow more current to flow than a comparable P channel charge pump.

21 Claims, 5 Drawing Sheets

N-CHANNEL NEGATIVE CHARGE PUMP

TECHNICAL FIELD

Embodiments of the invention relate to N-channel negative charge pumps. More particularly, embodiments of the invention relate to multi-state N-channel negative charge pumps that may be implemented using, for example, triple-well transistors.

BACKGROUND

Many computing applications such as, for example, cellular telephones, digital cameras, personal computers, and other devices, may use non-volatile memories to store data. Non-volatility is advantageous because it allows the data to be maintained in the absence of power. Thus, if the host system is turned off or the memory device is removed from the host system, the data will not be lost. One example of a non-volatile memory device is a flash memory.

As power consumption has been decreased for these devices, the supply voltage levels have generally been decreased. For example, supply voltages of 3.0 Volts or even less may be available to a flash memory. However, performing program and erase operations in flash memory components typically requires greater voltage levels than are available from host system supply voltages. For example, an erase operation may require −10.5 Volts or −12 Volts to be applied to the cell being erased. In order to achieve this negative voltage level, a charge pump circuit may be provided. In addition to the ability to provide the necessary negative voltage level, the charge pump must have the ability to provide sufficient current to perform the erase operation.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described herein is a negative charge pump architecture that utilizes a triple-well, no body effect NMOS circuitry. In one embodiment, the negative charge pumps described herein utilize triple-well N channel high mobility transistor devices with the deep N wells grounded. The parasitic bipolar transistors may be avoided such that the charge transfer occurs mainly in the channel of the transistor device. In one embodiment, the triple-well N channel devices may provide twice the mobility of P channel devices. P channel devices typically have a strong body effect that may negatively impact electron mobility. With the increased mobility of the N channel devices, negative charge pumps using N channel transistors may be more efficient and may allow more current to flow than a comparable P channel charge pump.

Figure 1:
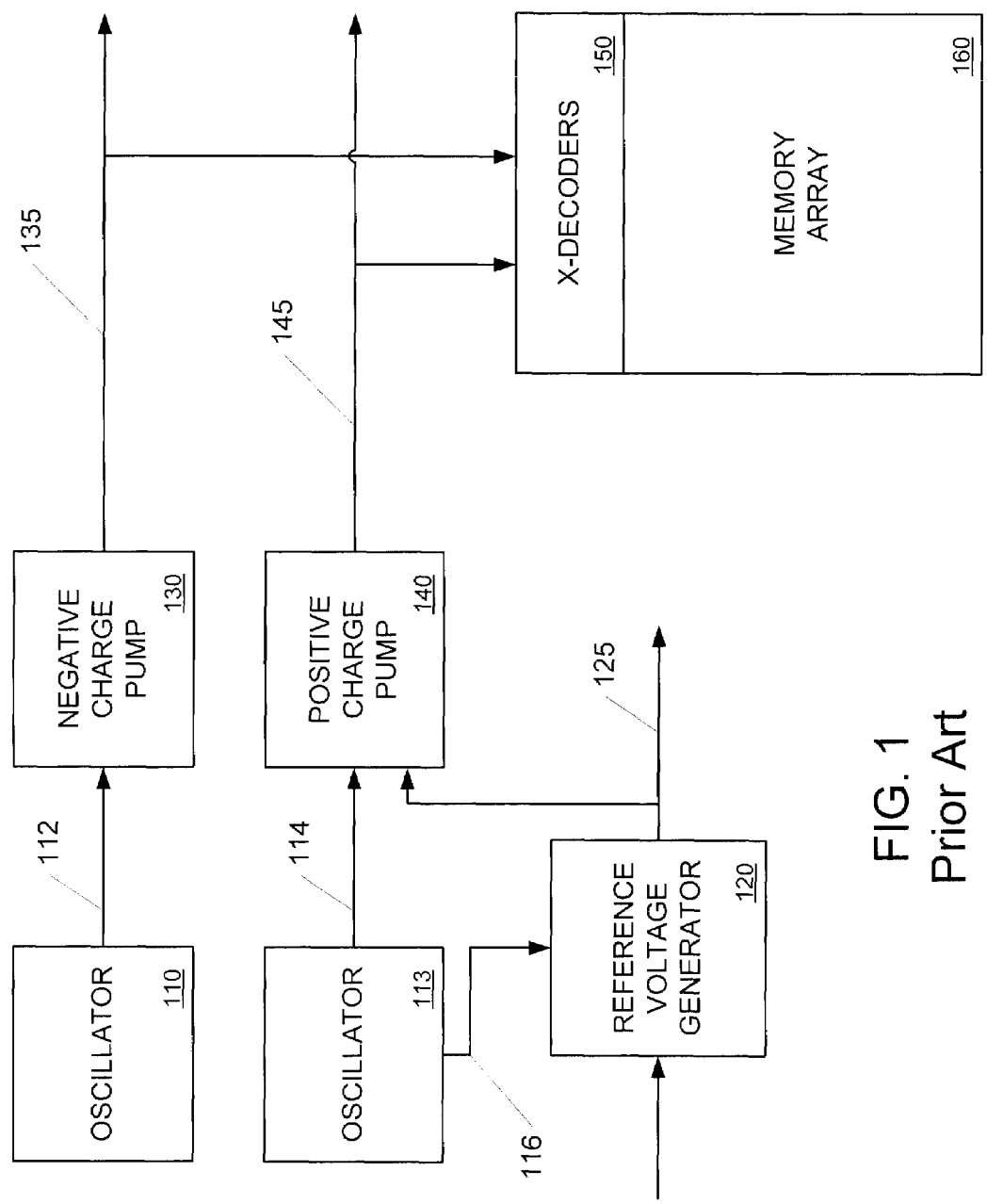
FIG. 1 is a block diagram of one embodiment of a flash memory circuit.

FIG. 1 is a block diagram of one embodiment of a flash memory circuit. While the negative charge pump is described in terms of a flash memory circuit, the negative charge pump architecture described herein is generally applicable and may be used wherever a negative charge pump is needed.

Reference generator 120 may provide a reference voltage 125 to positive charge pump 140, which may provide a regulated voltage at a predetermined voltage level (e.g., 5 Volts, 3.1 Volts, 3 Volts) over decoder supply line 145 to X-decoders 150 of memory array 160. In one embodiment, negative charge pump 130 may be a triple-well no body effect negative charge pump. Negative charge pump 130 may provide a negative voltage (e.g., −5 Volts, −10.5 Volts, −12 Volts) over decoder supply line 135 to X-decoders 150 of memory array 160.

Oscillator 110 may provide clock signal 112 that may periodically pulse or enable negative charge pump 130 during a standby mode. Oscillator 113 may provide clock signals 114 and 116 that periodically pulse or enable positive charge pump 140 and reference generator 120, respectively, when they are in standby mode. Clock signals 112, 114 and 116 may each have different timing parameters.

Figure 2:
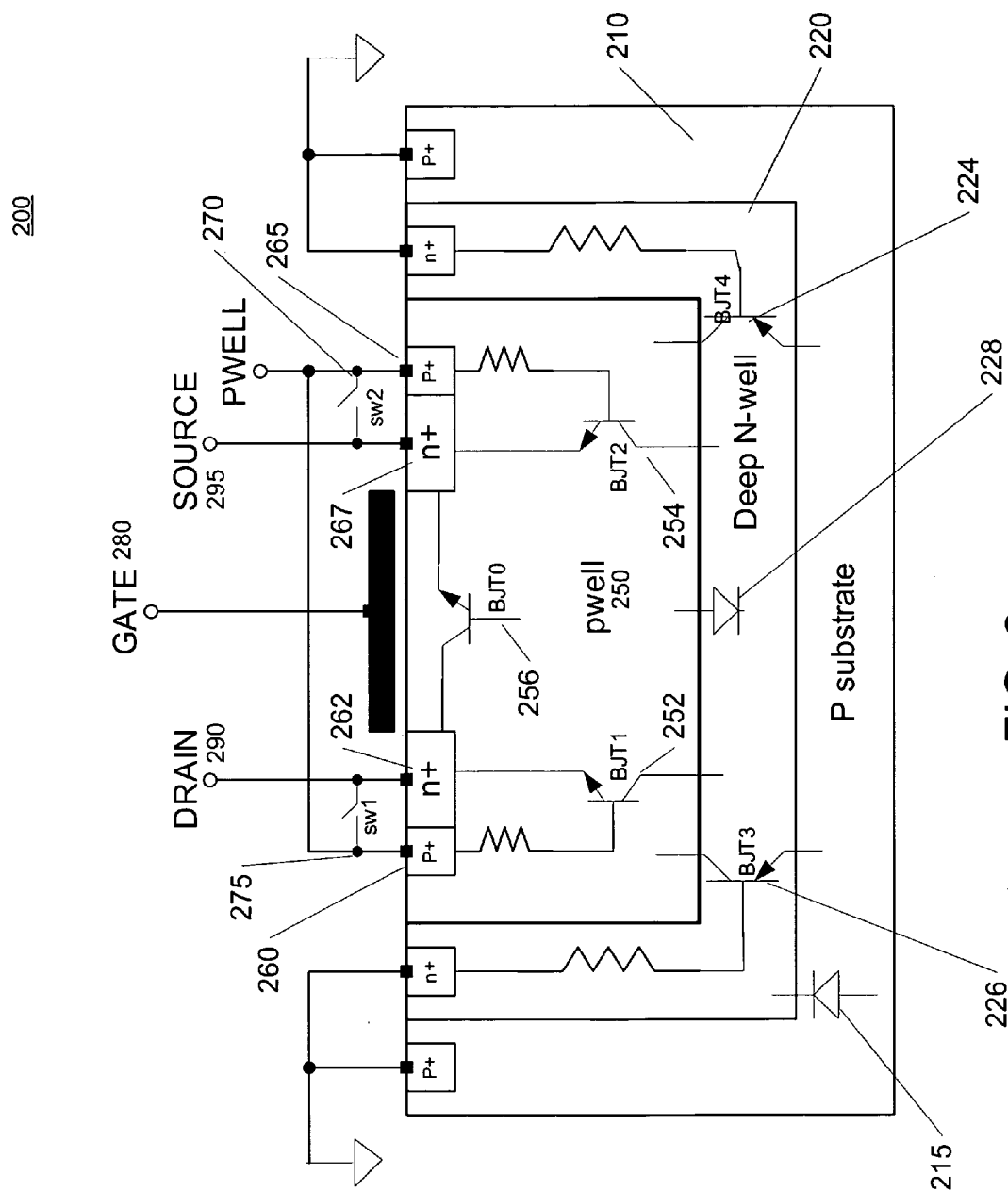
FIG. 2 illustrates on embodiment of a triple-well transistor that may be coupled as a pass gate in a stage of a negative charge pump.

FIG. 2 illustrates on embodiment of a triple-well transistor that may be coupled as a pass gate in a stage of a negative charge pump. Transistor 200 may be manufactured using any process or technology known in the art for manufacturing triple-well transistors.

In one embodiment, triple-well transistor 200 may include p-type substrate 210, deep n-well 220 and p well 250. Transistor 220 may further include gate 280, drain 290 and source 295. The arrangement of materials in transistor 220 will result in parasitic structures, for example, diodes and bipolar junction transistors (BJTs). In order to provide the pass gate functionality described herein, all parasitic diodes (e.g., 215, 228) should be reverse biased and all BJTs (e.g., 224, 226, 252, 254, 256) should be prevented from triggering.

In one embodiment, both p type substrate 210 and deep n-well 220 are grounded. As described in greater detail below, gate 280 may be coupled with a boot capacitor, drain 290 may be coupled to an output node of the charge pump stage and source 295 may be coupled with an input node of the charge pump stage. In one embodiment, source 295 may be an n-type region 267 with an adjacent p-type region 265. Switch 270 may be coupled between n-type region 267 and p-type region 265 to prevent parasitic BJT 254 from being triggered and allowing current to flow. Similarly, drain 290 may be an n-type region 262 with an adjacent p-type region 260. Switch 275 may be coupled between n-type region 262 and p-type region 260 to prevent parasitic BJT 252 from being triggered and allowing current to flow. In one embodiment, switch 270 and switch 275 are CMOS transistors as described in greater detail below.

Figure 3:
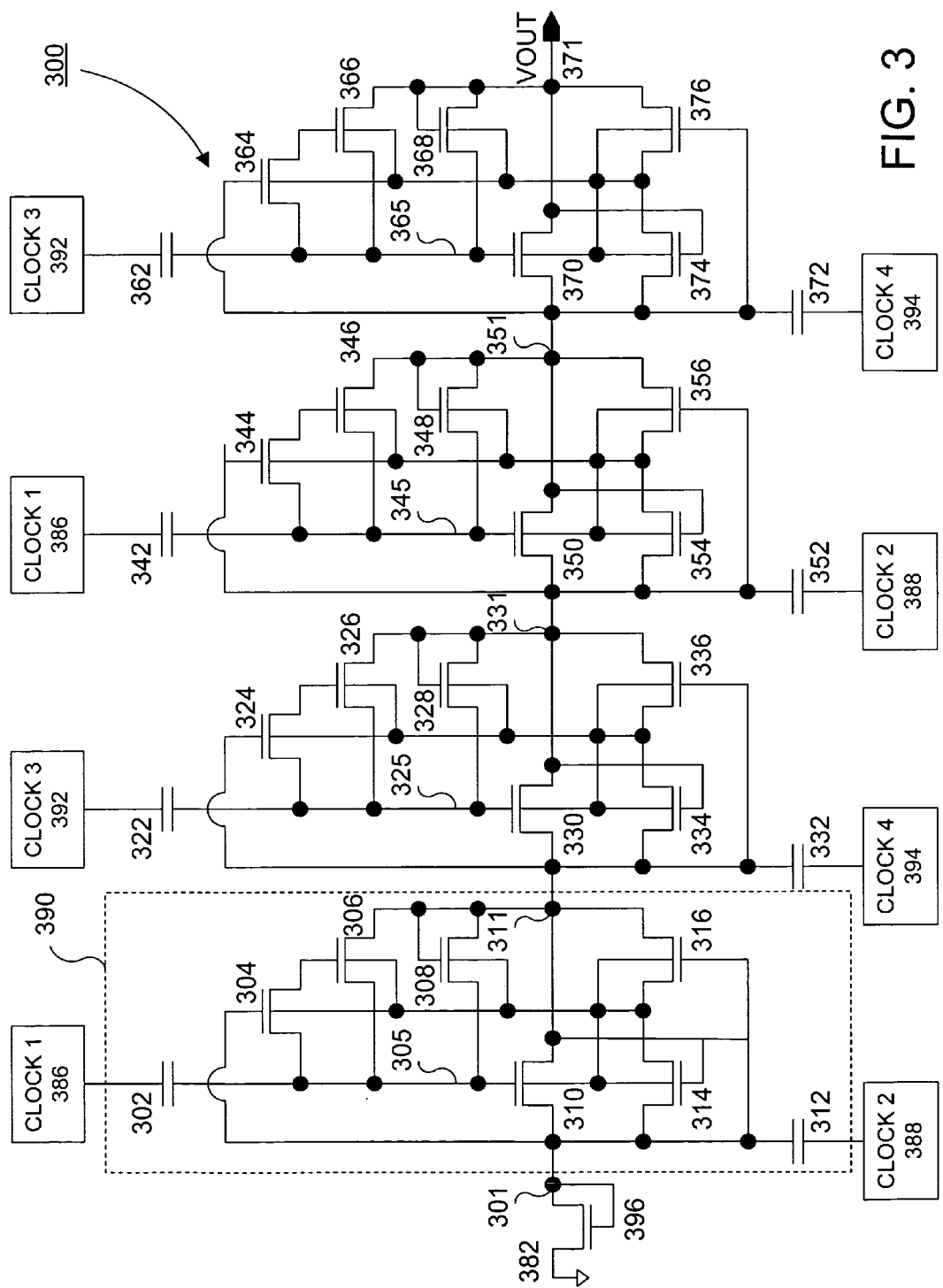
FIG. 3 is a simplified circuit diagram of one embodiment of a four stage triple well no body effect negative charge pump architecture.

FIG. 3 is a simplified circuit diagram of one embodiment of a four stage triple well no body effect negative charge pump architecture. Negative charge pump 300 may include switching transistors 310, 330, 350 and 370 connected in series between ground 382 and VOUT 341. Switching-transistors 310, 330, 350 and 370 may be triple well n-type field effect transistors such as the transistor of FIG. 2.

Negative charge pump 300 may further include pull-down transistors 308, 328, 348 and 368. Pull-down transistors 308, 328, 348 and 368 may be triple well n-type field effect transistors. The source of pull-down transistors 308, 328, 348 and 368 may be coupled with the gate of switching transistors 310, 330, 350 and 370, respectively. Pull-down transistors 308, 328, 348 and 368 may be diode connected, with the drain terminal and the gate terminal of each pull-down transistor 308, 328, 348 and 368 connected to the drain of the respective switching transistors 310, 330, 350 and 370.

Negative charge pump 300 may further include pull-up transistors 306, 326, 346 and 366. Pull-up transistors 306, 326, 346 and 366 may be triple well n-type field effect transistors. The drain of pull-up transistors 306, 326, 346 and 366 may be coupled with the gate terminal of switching transistors 310, 330, 350 and 370, respectively. The gate of pull-up transistors 306, 326, 346 and 366 may be coupled with the source of control devices 304, 324, 344 and 364, respectively.

In negative charge pump 300, control devices function as a switch between gate and drain terminals of the pull-up transistors. Control devices switch the pull-up transistors from being diode connected to not. Control devices 304, 324, 344 and 364 may be n-type field effect transistors. The drain terminals of control devices 304, 324, 344 and 364 may be coupled to the gate terminal of switching transistors 310, 330, 350 and 370, respectively. The gate terminals of control devices 304, 324, 344 and 364 may be coupled with the sources of switching transistors 310, 330, 350 and 370, respectively.

Control devices 304, 324, 344 and 364 may function to separate boot nodes 305, 325, 345 and 365 from diode connected pull-up devices 306, 326, 346 and 366, respectively. The gate terminals of triple well n-type devices 304, 324, 344 and 364 may . . . connect to the subsequent pump node (e.g., 301, 311, 331, 351) and stop the formerly diode connected 306, 326, 346 and 366 from discharging boot nodes 305, 325, 345 and 365 while the node is being booted by CLOCK 1, 386 or CLOCK 3, 392, respectively. By controlling the discharge of boot nodes 305, 325, 345 and 365 through pull-up devices 306, 326, 346 and 366, respectively, more gate drive is available to charge transfer devices 310, 330, 350 and 370. Thus, more charge may be passed from one pump stage to the next pump stage.

Negative charge pump 300 may further include storage capacitors 312, 332, 352 and 372. Storage capacitor 312 may be coupled CLOCK 2 388 and the source of switching transistor 310. Storage capacitor 332 may be connected between CLOCK 4 392 and the source of switching transistor 330. Storage capacitor 352 may be coupled between CLOCK 2 388 and the source of switching transistor 350. Storage capacitor 372 may be coupled between CLOCK 4 392 and the source of switching transistor 370.

Figure 4:
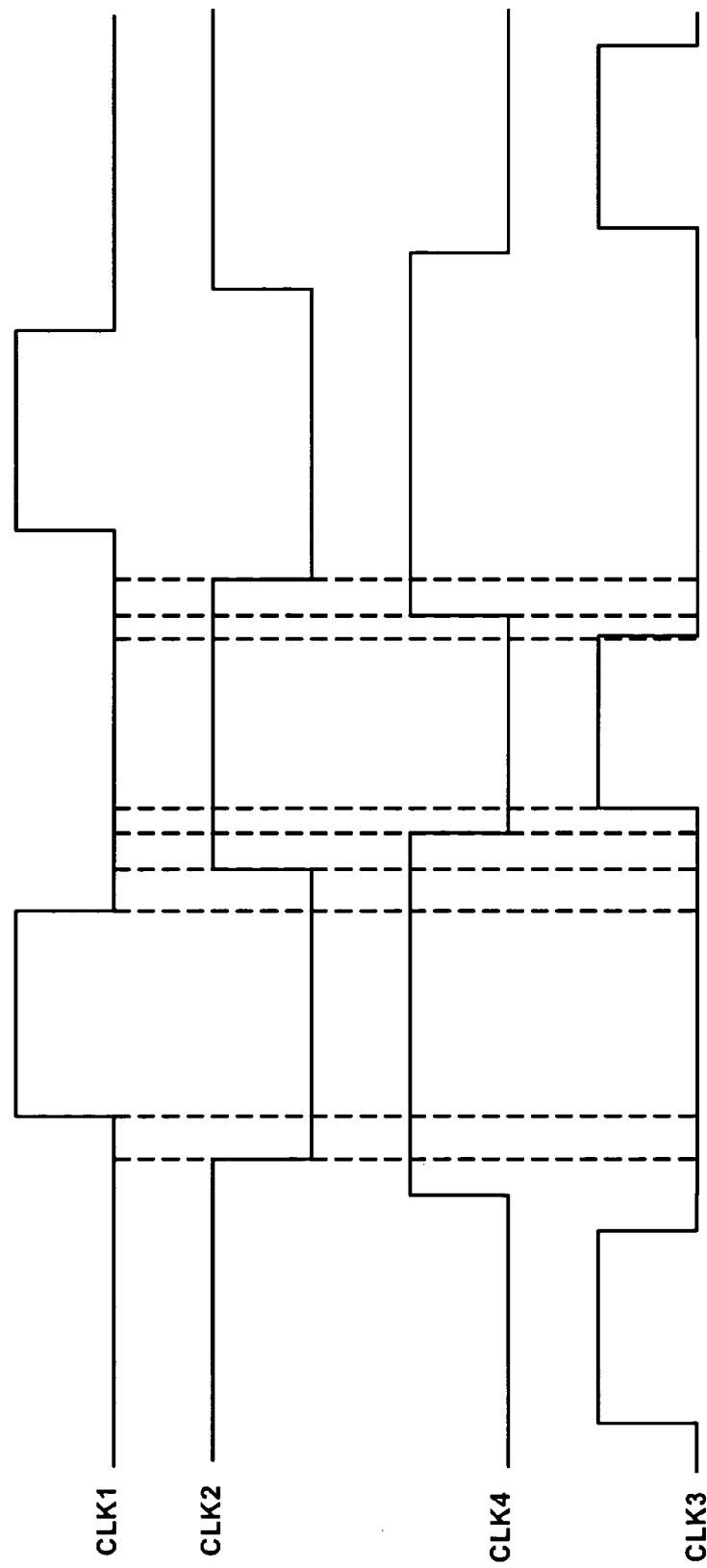
FIG. 4 is a timing diagram corresponding to the negative charge pump illustrated in FIGS. 2 and 3.

Negative charge pump 300 may further include boot node capacitors 302, 322, 342 and 362. Boot node capacitor 302 may be coupled between CLOCK 1 386 and the gate of switching transistor 310. Boot node capacitor 322 may be coupled between CLOCK 3 392 and the gate of 330. Boot node capacitor 342 may be coupled between CLOCK 1 386 and the gate of 350. Boot node capacitor 362 may be coupled between CLOCK 3 392 and the gate of 370. In one embodiment, the clock signals may be generated as illustrated in FIG. 4.

Negative charge pump 300 may include well biasing devices 314, 316, 334, 336, 354, 356, 374 and 376. The well biasing devices switching and initiate the p well potential of the triple well n-type devices to eliminate body effect. The p well switching may also prevent p-n junctions from being turned on to induce latch up. In one embodiment, the $V_{t_N}$ drop is 0.6 Volts compared to the $V_{t_P}$ of 2.2 Volts with a 12 Volt body effect when outputting -12 Volts. The drain terminals of the well biasing devices in each individual pump stage may be tied together with the substrate terminals of the n-type devices of that stage. The substrate terminals may also be referred to as the p well connection of the n-type devices.

The drains of well biasing devices 314 and 316 may be coupled together with the substrates of 304, 306, 308, 310, 314 and 316 in first pump stage 390. The drains of switching devices 334 and 336 may be coupled together with the substrate of 324, 326, 328, 330, 334 and 336 in the second pump stage. The drains of 354 and 356 may be coupled together with the substrate of 334, 346, 348, 350, 354 and 356 in the third pump stage. The drains of 374 and 376 may be coupled together with the substrates of 364, 366, 368, 370, 374 and 376 in the fourth pump stage.

The gates of 314, 334, 354 and 374 may be coupled to the source of switching transistors 310, 330, 350 and 370, respectively. The gate terminals of 316, 336, 356 and 376 may be coupled with drains of switching transistors 310, 330, 350 and 370, respectively. The sources of 314, 334, 354 and 374 may be coupled with the sources of switching transistors 310, 330, 350 and 370, respectively. The well biasing devices 314, 334, 354 and 374, and 316, 336, 356 and 376 may alternately switch the potential on the substrates between the low voltage potential at the drain and that at the source of the respective switching devices of the corresponding pump stages. Use of a triple well device may reduce the stress voltage inside a negative pump cell to approximately -13 Volts in comparison with the -16 Volt stress of some existing pump cells.

Node 301 may be defined by the connection of storage capacitor 312, the source of switching transistor 310, the gate of control device 314, and the gate and drain of transistor 396. Ground 382 may be connected to the source of 396. Node 311 may be defined by the connection of capacitor 332, the source of 330, the gate of 324, the drain of 310, the gate and drain of 308, and the source of 306. Node 331 may be defined by the connection of 352, the source of 350, the gate of 344, the drain of 330, the gate and drain of 328 and the source of 326. Node 351 may be defined by the connection of 372, the source of 350, the gate of 364, the drain of 350, the gate and drain of 348, and the source of 346. Node 371 may be defined by the connection of the source of 370, the gate and drain of 368, and the source of 366.

Boot node 305 may be defined by the connection of boot capacitor 302, the gate of switching transistor 310, the source of pull-down transistor 308, the drain of pull-up transistor 306, and the drain of control device 304. Boot node 325 may be defined by the connection of boot capacitor 322, the gate of 330, the source of 328, the drain of 326, and the drain of 324. Boot node 345 may be defined by the connection of 342, the gate of 350, the source of 348, the drain of 346, and the drain of 344. Boot node 365 may be defined by the connection of 362, the gate of 370, the source of 368, the drain of 366 and the drain of 364.

Negative charge pump 300 includes four negative charge pump stages. One of these stages is labeled 390 and includes storage capacitor 312, switching transistor 310, pull-down transistor 308, pull-up transistor 306, control device 304 and boot node capacitor 302. Stage 390 may receive input from ground 386 via diode connected transistor 396. The output of negative charge pump 300 is labeled VOUT 371. Positive charge may be transferred in the direction from node 371 to ground 382.

Although negative charge pump 300 is illustrated with four stages, a negative charge pump with any number of stages may be implemented. Further, the techniques described herein may be applied to other circuits where a negative voltage potential is needed. The architecture described herein may be used in a variety of charge pumps to improve output current and pumping efficiency. The increased output and efficiency may also lead to die size savings if the pump area of the charge pumps can be reduced as a result.

FIG. 4 is a timing diagram corresponding to the negative charge pump illustrated in FIGS. 2 and 3. The description of FIG. 4 corresponds to operation of only a portion of the negative charge pump described herein. In one embodiment, each stage of the negative charge pump may function in a similar manner. In one embodiment, the clock signals may be generated by a clock driver circuit that may receive an oscillator output signal and generate four clock signals that are out of phase with respect to each other.

The overlap and non-overlap of the four clock signals may result in operation of the charge pump stages as described below. In one embodiment, the clock signals may switch between 3.1 Volts (equal to Vcc) and ground. In general, the p well switching devices (e.g., 314, 334, 354, 374, 316, 336, 356 and 376 of FIG. 3) may function to connect the p well to the source and drains of the pass transistors (e.g., 310, 330, 350 and 370 of FIG. 3). The switching devices may on alternately when CLK2 (e.g., CLOCK 2 388 of FIG. 3) and CLK4 (e.g., CLOCK 4 394 of FIG. 3) switch. The p well may track the most negative voltages of the source or drain so the body effect in the pass devices may be reduced or even eliminated. The switching devices may pass the lowest potential to the p well in order to prevent turning on the parasitic BJTs (e.g., 252 and 254) of the triple well pass transistors during the clock phases. The deep n well of all triple well transistors may be coupled to ground, which is the highest potential in the negative charge pump.

In one embodiment, when the CLK4 signal is high the pump stage input (e.g., 311) may be drawn high, which may allow the boot node (e.g., 305) to be precharged through a pull-down transistor (e.g., 308) and may also allow the control device (e.g., 324) to activate the pull-up transistor (e.g., 324) to discharge the boot node (e.g., 325) and turn off the switching transistor (e.g., 330) to prevent back conduction between nodes (e.g., 331 to 311). The deep n well of the pump stage may be connected to the input and output of the pump stage. The output of each pump stage should be more negative when the pass transistor is turned off.

In one embodiment, when the CLK2 signal is low, the output node (e.g., 301) goes low and is ready to receive charge from the input node (e.g., 311) and turn off the control device (e.g., 304). The output node (e.g., 301) goes low because the node is coupled with CLK2 going low. The p well may float upwards when CLK1 and CLK2 are both low.

In one embodiment, when the CLK1 signal is high the boot node (e.g., 305) may go high and the switching transistor (e.g., 310) may turn on to allow charge sharing between the input node (e.g., 311) and the output node (e.g., 301). The input node (e.g., 311) may drift upward as the output node (e.g., 301) is pulled downward. In one embodiment, when the CLK1 signal is low, the charge transfer between the input node (e.g., 311) and the output node (e.g., 301) stops and the potential of the two nodes may even out.

In one embodiment, when the CLK2 signal is high, the output node (e.g., 301) may go high, which may allow the output node (e.g., 301) to precharge the input switch transistor (e.g., 396) through a control transistor and also allow the control device (e.g., 304) to turn on and to activate the pull-up device (e.g., 306), which may discharge the boot node (e.g., 305) to prevent back conductance between the input output node (e.g., 311) and the input node (e.g., 301). The deep n well for the stage may coupled with the output node through the control devices (e.g., 334 and 336).

In one embodiment, when the CLK4 signal is low, the output node (e.g., 311) may go low to receive charge from the input node (e.g., 331) and turn off the control device (e.g., 324). The deep n well of the stage may be coupled to the output node (e.g., 311) through the control device (e.g., 334).

In one embodiment, when the CLK3 signal is high the boot node (e.g., 325) may go high and switching transistor (e.g., 330) and the input transistor (e.g., 396) turn on. Charge transfers between input nodes (e.g., 331 and 311) and output node (e.g., 301) and ground (e.g., 382). The input node (e.g., 331) may be coupled upwards while the output node (e.g., 311) is coupled downward. When the CLK3 signal is low, the charge transfer may stop and input and output nodes may level out. The cycle may then be repeated.

Figure 5:
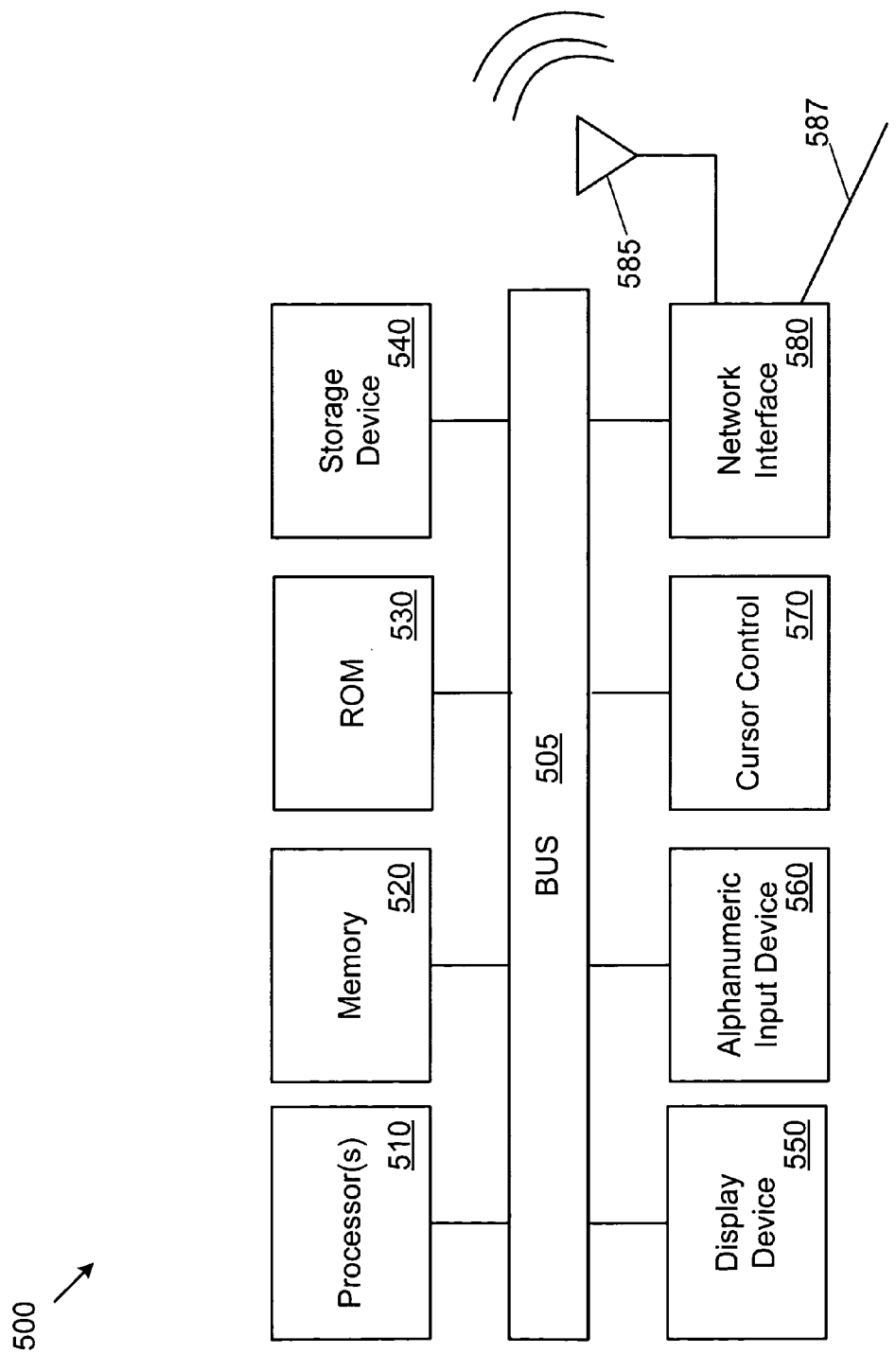
FIG. 5 is a block diagram of one embodiment of an electronic system.

FIG. 5 is a block diagram of one embodiment of an electronic system. The electronic system illustrated in FIG. 5 is intended to represent a range of electronic systems (either wired or wireless) including, for example, desktop computer systems, laptop computer systems, cellular telephones, personal digital assistants (PDAs) including cellular-enabled PDAs, set top boxes. Alternative electronic systems may include more, fewer and/or different components.

Electronic system 500 includes bus 505 or other communication device to communicate information, and processor 510 coupled to bus 505 that may process information. While electronic system 500 is illustrated with a single processor, electronic system 500 may include multiple processors and/or co-processors. Electronic system 500 further may include random access memory (RAM) or other dynamic storage device 520 (referred to as main memory), coupled to bus 505 and may store information and instructions that may be executed by processor 510. Memory 520 may also be used to store temporary variables or other intermediate information during execution of instructions by processor 510. In one embodiment, memory 520 may include a flash memory device having a negative charge pump as described herein.

Electronic system 500 may also include read only memory (ROM) and/or other static storage device 530 coupled to bus 505 that may store static information and instructions for processor 510. Data storage device 540 may be coupled to bus 505 to store information and instructions. Data storage device 540 such as a magnetic disk or optical disc and corresponding drive may be coupled to electronic system 500. In one embodiment, data storage device 540 may include a flash memory device having a negative charge pump as described herein.

Electronic system 500 may also be coupled via bus 505 to display device 550, such as a cathode ray tube (CRT) or liquid crystal display (LCD), to display information to a user. Alphanumeric input device 560, including alphanumeric and other keys, may be coupled to bus 505 to communicate information and command selections to processor 510. Another type of user input device is cursor control 570, such as a mouse, a trackball, or cursor direction keys to communicate direction information and command selections to processor 510 and to control cursor movement on display 550.

Electronic system 500 further may include network interface(s) 580 to provide access to a network, such as a local area network. Network interface(s) 580 may include, for example, a wireless network interface having antenna 585, which may represent one or more antenna(e), for example one or more omnidirectional antennae. Network interface(s) 580 may also include, for example, a wired network interface to communicate with remote devices via network cable 587, which may be, for example, an Ethernet cable, a coaxial cable, a fiber optic cable, a serial cable, or a parallel cable.

In one embodiment, network interface(s) 580 may provide access to a wireless local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 580 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A negative charge pump comprising:
   a first boot capacitor having a first terminal coupled to receive a first clock signal;
   a first pump capacitor having a first terminal coupled to receive a second clock signal;
   a triple-well n-channel pass gate transistor having a deep n-well and a p-type substrate coupled with ground, a gate coupled to a second terminal of the first boot capacitor, a source coupled with a second terminal of the first pump capacitor and a drain coupled to receive an input potential;
   a first n-type transistor having a source coupled with a p-well region of the pass gate transistor, a drain coupled with the second terminal of the first pump capacitor and a gate coupled to receive the input potential; and
   a second n-type transistor having a source coupled with the p-well region of the pass gate transistor, a drain coupled to receive the input potential and a gate coupled to the second terminal of the first pump capacitor.

2. The charge pump of claim 1 further comprising:
   a third n-type transistor having a drain coupled with the second terminal of the first boot capacitor, a gate coupled with the second terminal of the first boot capacitor and a source coupled to receive the input potential; and
   a fourth n-type transistor having a source coupled with the second terminal of the first boot capacitor, a gate coupled to receive the input potential and a drain coupled to receive the input potential.

3. The charge pump of claim 1 further comprising:
   a second boot capacitor having a first terminal coupled to receive a third clock signal;
   a second pump capacitor having a first terminal coupled to receive a fourth clock signal;
   a second triple-well n-channel pass gate transistor having a deep n-well and a p-type substrate coupled with ground, a gate coupled to a second terminal of the second boot capacitor, a source coupled with a second terminal of the second pump capacitor and a drain coupled to the second terminal of the first pump capacitor;
   a fifth n-type transistor having a source coupled with a p-well region of the second pass gate transistor, a drain coupled with the second terminal of the second pump capacitor and a gate coupled to the second terminal of the first pump capacitor; and
   a sixth n-type transistor having a source coupled with the p-well region of the second pass gate transistor, a drain coupled to the second terminal of the first pump capacitor and a gate coupled to the second terminal of the second pump capacitor.

4. The charge pump of claim 3 further comprising:
   a seventh n-type transistor having a drain coupled with the second terminal of the second boot capacitor, a gate coupled with the second terminal of the second boot capacitor and a source coupled to the second terminal of the first boot capacitor; and
   an eighth n-type transistor having a source coupled with the second terminal of the second boot capacitor, a gate coupled to the second terminal of the first pump capacitor and a drain coupled to the second terminal of the first pump capacitor.

5. The charge pump of claim 4 wherein during a first period of time the first clock signal is a low level and the second clock is a high level, during a second period of time immediately following the first period of time, the first clock signal is at the low level and the second clock signal is at the low level, during a third period of time immediately following the second period of time, the first clock signal is at the high level and the second clock signal is at the low level, during a fourth period of time immediately following the third period of time, the first clock signal is at the low level and the second clock signal is at the low level, during a fifth period of time immediately following the fourth period of time, the first clock signal is at the low level and the second clock signal is at the high level, during a sixth period of time immediately following the fifth period of time, the first clock signal is at the low level and the second clock signal is at the high level, during seventh period of time immediately following the sixth period of time, the first clock signal is at the low level and the second clock signal is at the high level, during an eighth period of time immediately following the seventh period of time, the first clock signal is at the low level and the second clock signal is at the high level.

6. The charge pump of claim 5 wherein during the first period of time the third clock signal is the low level and the fourth clock is a high level, during the second period of time, the third clock signal is at the low level and the fourth clock signal is at the high level, during the third period of time, the third clock signal is at the low level and the fourth clock signal is at the high level, during a fourth period of time, the third clock signal is at the low level and the fourth clock signal is at the high level, during the fifth period of time, the third clock signal is at the low level and the fourth clock signal is at the high level, during the sixth period of time, the third clock signal is at the low level and the fourth clock signal is at the low level, during the seventh period of time, the third clock signal is at the high level and the fourth clock signal is at the low level, and during the eighth period of time, the third clock signal is at the low level and the fourth clock signal is at the low level.

7. The charge pump of claim 3 further comprising:
a third boot capacitor having a first terminal coupled to receive the first clock signal;
a third pump capacitor having a first terminal coupled to receive the second clock signal;
a third triple-well n-channel pass gate transistor having a deep n-well and a p-type substrate coupled with ground, a gate coupled to a second terminal of the third boot capacitor, a source coupled with a second terminal of the third pump capacitor and a drain coupled to the second terminal of the second pump capacitor;
a seventh n-type transistor having a source coupled with a p-well region of the third pass gate transistor, a drain coupled with the second terminal of the third pump capacitor and a gate coupled to the second terminal of the second pump capacitor; and
an eighth n-type transistor having a source coupled with the p-well region of the third pass gate transistor, a drain coupled to the second terminal of the second pump capacitor and a gate coupled to the second terminal of the third pump capacitor.

8. The charge pump of claim 7 further comprising:
a ninth n-type transistor having a drain coupled with the second terminal of the third boot capacitor, a gate coupled with the second terminal of the third boot capacitor and a source coupled to the second terminal of the second boot capacitor; and
a tenth n-type transistor having a source coupled with the second terminal of the third boot capacitor, a gate coupled to the second terminal of the second pump capacitor and a drain coupled to the second terminal of the second pump capacitor.

9. A flash memory device comprising:
an array of memory cells;
a positive charge pump coupled with the array of memory cells; and
a negative charge pump coupled with the array of memory cells, the negative charge pump having a first boot capacitor having a first terminal coupled to receive a first clock signal, a first pump capacitor having a first terminal coupled to receive a second clock signal, a triple-well n-channel pass gate transistor having a deep n-well and a p-type substrate coupled with ground, a gate coupled to a second terminal of the first boot capacitor, a source coupled with a second terminal of the first pump capacitor and a drain coupled to receive an input potential, a first n-type transistor having a source coupled with a p-well region of the pass gate transistor, a drain coupled with the second terminal of the first pump capacitor and a gate coupled to receive the input potential, and a second n-type transistor having a source coupled with the p-well region of the pass gate transistor, a drain coupled to receive the input potential and a gate coupled to the second terminal of the first pump capacitor.

10. The flash memory device of claim 9 wherein the negative charge pump further includes a third n-type transistor having a drain coupled with the second terminal of the first boot capacitor, a gate coupled with the second terminal of the first boot capacitor and a source coupled to receive the input potential and a fourth n-type transistor having a source coupled with the second terminal of the first boot capacitor, a gate coupled to receive the input potential and a drain coupled to receive the input potential.

11. The flash memory device of claim 9 wherein the negative charge pump further includes a second boot capacitor having a first terminal coupled to receive a third clock signal, a second pump capacitor having a first terminal coupled to receive a fourth clock signal, a second triple-well n-channel pass gate transistor having a deep n-well and a p-type substrate coupled with ground, a gate coupled to a second terminal of the second boot capacitor, a source coupled with a second terminal of the second pump capacitor and a drain coupled to the second terminal of the first pump capacitor, a fifth n-type transistor having a source coupled with a p-well region of the second pass gate transistor, a drain coupled with the second terminal of the second pump capacitor and a gate coupled to the second terminal of the first pump capacitor and a sixth n-type transistor having a source coupled with the p-well region of the second pass gate transistor, a drain coupled to the second terminal of the first pump capacitor and a gate coupled to the second terminal of the second pump capacitor.

12. The flash memory device of claim 11 wherein the negative charge pump further includes a seventh n-type transistor having a drain coupled with the second terminal of the second boot capacitor, a gate coupled with the second terminal of the second boot capacitor and a source coupled to the second terminal of the first boot capacitor and an eighth n-type transistor having a source coupled with the second terminal of the second boot capacitor, a gate coupled to the second terminal of the first pump capacitor and a drain coupled to the second terminal of the first pump capacitor.

13. The flash memory device of claim 11 wherein during a first period of time the first clock signal is a low level and the second clock is a high level, during a second period of time immediately following the first period of time, the first clock signal is at the low level and the second clock signal is at the low level, during a third period of time immediately following the second period of time, the first clock signal is at the high level and the second clock signal is at the low level, during a fourth period of time immediately following the third period of time, the first clock signal is at the low level and the second clock signal is at the low level, during a fifth period of time immediately following the fourth period of time, the first clock signal is at the low level and the second clock signal is at the high level, during a sixth period of time immediately following the fifth period of time, the first clock signal is at the low level and the second clock signal is at the high level, during seventh period of time immediately following the sixth period of time, the first clock signal is at the low level and the second clock signal is at the high level, during an eighth period of time immediately following the seventh period of time, the first clock signal is at the low level and the second clock signal is at the high level.

14. The flash memory device of claim 13 wherein during the first period of time the third clock signal is the low level and the fourth clock is a high level, during the second period of time, the third clock signal is at the low level and the fourth clock signal is at the high level, during the third period of time, the third clock signal is at the low level and the fourth clock signal is at the high level, during a fourth period of time, the third clock signal is at the low level and the fourth clock signal is at the high level, during the fifth period of time, the third clock signal is at the low level and the fourth clock signal is at the high level, during the sixth period of time, the third clock signal is at the low level and the fourth clock signal is at the low level, during the seventh period of time, the third clock signal is at the high level and the fourth clock signal is at the low level, and during the eighth period of time, the third clock signal is at the low level and the fourth clock signal is at the low level.

15. The flash memory device of claim 11 wherein the negative charge pump further includes a third boot capacitor having a first terminal coupled to receive the first clock signal, a third pump capacitor having a first terminal coupled to receive the second clock signal, a third triple-well n-channel pass gate transistor having a deep n-well and a p-type substrate coupled with ground, a gate coupled to a second terminal of the third boot capacitor, a source coupled with a second terminal of the third pump capacitor and a drain coupled to the second terminal of the second pump capacitor, a seventh n-type transistor having a source coupled with a p-well region of the third pass gate transistor, a drain coupled with the second terminal of the third pump capacitor and a gate coupled to the second terminal of the second pump capacitor and an eighth n-type transistor having a source coupled with the p-well region of the third pass gate transistor, a drain coupled to the second terminal of the second pump capacitor and a gate coupled to the second terminal of the third pump capacitor.

16. A wireless communications device comprising:
a bus;
a substantially omnidirectional antenna coupled with the bus; and
a flash memory device coupled with the bus having an array of memory cells, a positive charge pump coupled with the array of memory cells and a negative charge pump coupled with the array of memory cells, the negative charge pump having a first boot capacitor having a first terminal coupled to receive a first clock signal, a first pump capacitor having a first terminal coupled to receive a second clock signal, a triple-well n-channel pass gate transistor having a deep n-well and a p-type substrate coupled with ground, a gate coupled to a second terminal of the first boot capacitor, a source coupled with a second terminal of the first pump capacitor and a drain coupled to receive an input potential, a first n-type transistor having a source coupled with a p-well region of the pass gate transistor, a drain coupled with the second terminal of the first pump capacitor and a gate coupled to receive the input potential, and a second n-type transistor having a source coupled with the p-well region of the pass gate transistor, a drain coupled to receive the input potential and a gate coupled to the second terminal of the first pump capacitor.

17. The wireless communications device of claim 16 wherein the negative charge pump further includes a third n-type transistor having a drain coupled with the second terminal of the first boot capacitor, a gate coupled with the second terminal of the first boot capacitor and a source coupled to receive the input potential and a fourth n-type transistor having a source coupled with the second terminal of the first boot capacitor, a gate coupled to receive the input potential and a drain coupled to receive the input potential.

18. The wireless communications device of claim 16 wherein the negative charge pump further includes a second boot capacitor having a first terminal coupled to receive a third clock signal, a second pump capacitor having a first terminal coupled to receive a fourth clock signal, a second triple-well n-channel pass gate transistor having a deep n-well and a p-type substrate coupled with ground, a gate coupled to a second terminal of the second boot capacitor, a source coupled with a second terminal of the second pump capacitor and a drain coupled to the second terminal of the first pump capacitor, a fifth n-type transistor having a source coupled with a p-well region of the second pass gate transistor, a drain coupled with the second terminal of the second pump capacitor and a gate coupled to the second terminal of the first pump capacitor and a sixth n-type transistor having a source coupled with the p-well region of the second pass gate transistor, a drain coupled to the second terminal of the first pump capacitor and a gate coupled to the second terminal of the second pump capacitor.

19. The wireless communications device of claim 18 wherein the negative charge pump further includes a seventh n-type transistor having a drain coupled with the second terminal of the second boot capacitor, a gate coupled with the second terminal of the second boot capacitor and a source coupled to the second terminal of the first boot capacitor and an eighth n-type transistor having a source coupled with the second terminal of the second boot capacitor, a gate coupled to the second terminal of the first pump capacitor and a drain coupled to the second terminal of the first pump capacitor.

20. The wireless communications device of claim 16 wherein during a first period of time the first clock signal is a low level and the second clock is a high level, during a second period of time immediately following the first period of time, the first clock signal is at the low level and the second clock signal is at the low level, during a third period of time immediately following the second period of time, the first clock signal is at the high level and the second clock signal is at the low level, during a fourth period of time immediately following the third period of time; the first clock signal is at the low level and the second clock signal is at the low level, during a fifth period of time immediately following the fourth period of time, the first clock signal is at the low level and the second clock signal is at the high level, during a sixth period of time immediately following the fifth period of time, the first clock signal is at the low level and the second clock signal is at the high level, during seventh period of time immediately following the sixth period of time, the first clock signal is at the low level and the second clock signal is at the high level, during an eighth period of time immediately following the seventh period of time, the first clock signal is at the low level and the second clock signal is at the high level.

21. The wireless communications device of claim 20 wherein during the first period of time the third clock signal is the low level and the fourth clock is a high level, during the second period of time, the third clock signal is at the low level and the fourth clock signal is at the high level, during the third period of time, the third clock signal is at the low level and the fourth clock signal is at the high level, during a fourth period of time, the third clock signal is at the low level and the fourth clock signal is at the high level, during the fifth period of time, the third clock signal is at the low level and the fourth clock signal is at the high level, during the sixth period of time, the third clock signal is at the low level and the fourth clock signal is at the low level, during the seventh period of time, the third clock signal is at the high level and the fourth clock signal is at the low level, and during the eighth period of time, the third clock signal is at the low level and the fourth clock signal is at the low level.

* * * * *